(12) United States Patent
Strandell (10) Patent No.: US 8,429,398 B2
(45) Date of Patent: Apr. 23, 2013

(54) METHOD AND APPARATUS OF PROVIDING PERSONALIZED VIRTUAL ENVIRONMENT

(75) Inventor: Toni Strandell, Helsinki (FI)

(73) Assignee: Nokia Corporation, Espoo (FI)

( * ) Notice: Subject to any disclaimer, the term of this patent is extended or adjusted under 35 U.S.C. 154(b) by 514 days.

(21) Appl. No.: 12/463,119

(22) Filed: May 8, 2009

(65) Prior Publication Data

US 2010/0287605 A1  Nov. 11, 2010

(51) Int. Cl.
*H04L 29/06* (2006.01)
*G06F 17/30* (2006.01)

(52) U.S. Cl.
USPC .................................. 713/155; 707/3; 726/7

(58) Field of Classification Search .................. 713/155; 707/3; 726/7
See application file for complete search history.

(56) References Cited

U.S. PATENT DOCUMENTS

| 7,269,590 B2 | 9/2007 | Hull et al. |
| 2004/0078476 A1 | 4/2004 | Razdow et al. |
| 2008/0028205 A1 | 1/2008 | Yang |
| 2008/0244413 A1 | 10/2008 | Sampson et al. |
| 2008/0301582 A1 | 12/2008 | Gluck |
| 2009/0031407 A1* | 1/2009 | Kuang ............................. 726/7 |
| 2009/0150346 A1* | 6/2009 | Soderstrom ....................... 707/3 |
| 2009/0210503 A1 | 8/2009 | Chang et al. |
| 2009/0234876 A1* | 9/2009 | Schigel et al. ............... 707/102 |

FOREIGN PATENT DOCUMENTS

WO   WO 2008/043143 A1   4/2008

OTHER PUBLICATIONS

International search report and written opinion for corresponding international app. No. PCT/FI2010/050280 dated Jul. 28, 2010, pp. 1-17.

* cited by examiner

*Primary Examiner* — Philip Lee
(74) *Attorney, Agent, or Firm* — Ditthavong Mori & Steiner, P.C.

(57) ABSTRACT

An approach is provided for providing a personalized virtual environment for a visitor of a service community. A comparison is made of identification information of the visitor with contact entries of a plurality of registered users of a service community. Additionally, an identification is made of content of one or more of the plurality of registered users having a contact entry that matches the identification information of the visitor to provide a personalized virtual environment of the visitor in the service community.

17 Claims, 9 Drawing Sheets

METHOD AND APPARATUS OF PROVIDING PERSONALIZED VIRTUAL ENVIRONMENT

BACKGROUND

Wireless (e.g., cellular) service providers and device manufacturers are continually challenged to deliver value and convenience to consumers by, for example, providing compelling network services, applications, and content, as well as user-friendly devices. An important differentiator in this industry is the user interface. In particular, user interfaces for online communities can be determinative of the success of failure of such network services.

SOME EXAMPLE EMBODIMENTS

According to one embodiment, a method comprises comparing identification information of a visitor with contact entries of a plurality of registered users of a service community, and identifying content of one or more of the plurality of registered users having a contact entry that matches the identification information of the visitor to provide a personalized virtual environment of the visitor in the service community.

According to another embodiment, an apparatus comprising at least one processor, and at least one memory including computer program code, the at least one memory and the computer program code configured to, with the at least one processor, cause the apparatus to compare identification information of a visitor with contact entries of a plurality of registered users of a service community, and to identify content of one or more of the plurality of registered users having a contact entry that matches the identification information of the visitor to provide a personalized virtual environment of the visitor in the service community.

According to another embodiment, a method comprises means for comparing identification information of a visitor with contact entries of a plurality of registered users of a service community; and means for identifying content of one or more of the plurality of registered users having a contact entry that matches the identification information of the visitor to provide a personalized virtual environment of the visitor in the service community.

According to another embodiment, a method comprises providing identification information of a visitor to a service community having a plurality of registered users for comparison of the identification information of the visitor with contact entries of the plurality of registered users, and for identification of content of one or more of the plurality of registered users that have a contact entry that matches the identification information of the visitor to provide a personalized virtual environment of the visitor in the service community.

According to yet another embodiment, an apparatus comprises means for providing identification information of a visitor to a service community having a plurality of registered users for comparison of the identification information of the visitor with contact entries of the plurality of registered users, and for identification of content of one or more of the plurality of registered users that have a contact entry that matches the identification information of the visitor to provide a personalized virtual environment of the visitor in the service community.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

A method and apparatus for providing a personalized virtual environment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
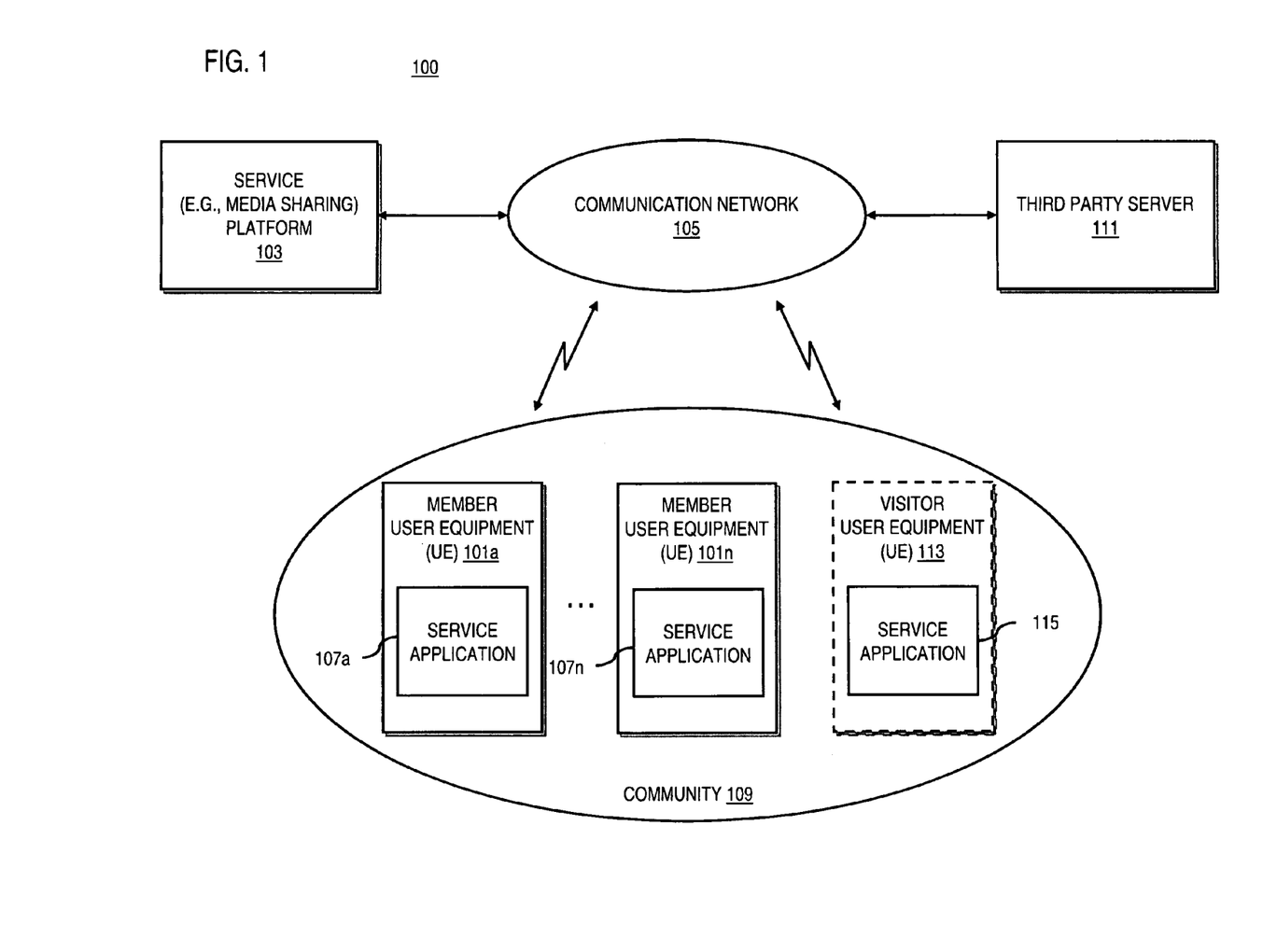
FIG. 1 is a diagram of a communication system capable of providing a personalized virtual environment for a visitor of a media sharing community, according to an exemplary embodiment.

FIG. 1 is a diagram of a communication system capable of providing a personalized virtual environment for a visitor of a media sharing community, according to one embodiment. In certain embodiments, personalized virtual environment involves presenting a user with a graphical user interface (GUI) that is customized to the user's preferences; for example, the visual environment can involve web pages, etc. As shown in FIG. 1, system 100 comprises one or more registered user or member user equipment (UEs), e.g., UEs 101a-101n, having connectivity to a service application or platform 103 via a communication network 105. For the purposes of illustration, the service platform 103 is described with respect to media sharing; however, it is contemplated that other services, e.g., social networking, can be provided. The UEs 101a101n are any type of mobile terminal, fixed terminal, or portable terminal including mobile handsets, mobile phones, mobile communication devices, stations, units, devices, multimedia tablets, digital book readers, game devices, audio/video players, digital cameras/camcorders, positioning device, televisions, radio broadcasting receivers, Internet nodes, communicators, desktop computers, laptop computers, Personal Digital Assistants (PDAs), or any combination thereof. Under this scenario, the UE 101a employs a radio link to access network 105, while connectivity of UE 101n to the network 105 can be provided over a wired link. It is also contemplated that the UEs 101a-101n can support any type of interface to the user (such as "wearable" circuitry, etc.). In exemplary embodiments, the UEs 101a-101n each includes a media application 107a-107n for providing a media sharing user interface for use in a service (e.g., media sharing) community 109 that allows the various UEs 101a-101n to share media. The UEs 101a-101n may share various forms of media with other registered users via the communication network 105 using the media sharing platform 103 or a third party server 111 with connectivity over the communication network 105.

In addition to registered users, visitors (unregistered users) can use user equipment (UEs), e.g., UE 113, to access the media sharing community on a limited and/or temporary basis. UE 113 has connectivity to the media sharing service application or platform 103 via the communication network 105, and the UE 113 has a media application 115 for providing a user interface for use in the media sharing community 109 that allows the various UEs 101a-101n to access and/or share media with registered users and/or other visitors.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

By way of example, the UEs 101a101n and 113 communicate with the media sharing platform 103 and other members of the community 109 over the communication network 105 using standard protocols. The UEs 101a-10n and 113 and the media sharing platform 103 are network nodes with respect to the communication network 105. In this context, a protocol includes a set of rules defining how the network nodes within the communication network 105 interact with each other based on information sent over the communication links. For instance, members of the community 109 may communicate using a social networking protocol. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The system 100 relates to services, such as web services, and is configured to provide a personalized view to a visitor of a media sharing/publishing site. Media sharing sites would like to offer a personalized view for all the site users. However, in conventional systems, non-registered users (i.e., visitors) visiting these sites all see a similar generic view. Media sharing is also more fun when a user's friends can attend as well. The lower the barrier to participate in consuming shared media, the better for the site.

Currently, media sharing sites, such as Flickr®, YouTube® or Ovi Share®, provide similar view to visitors. Visitors can browse the content based on some predefined categories (most viewed, most commented, most interesting/popular, etc.), or use keyword searching to find interesting media. Visitors have to register to the site so that the site can record their behavior and suggest media, and so that a user can form a network of friends, buddies, etc. to see their content. Some sites also store information to a visitors browser (in cookies), so that when the visitor returns, the site can suggest media or do other actions based on the visitor's history. However, the inventor has determined that it would be extremely beneficial for a site to know who of the registered users are of interest to the visitor, starting from the first visit. This is not possible using conventional systems.

The system 100 can be used to allow a media sharing site, for example one connected to registered users' mobile devices, such as Ovi Share®, Nokia Image Exchange, etc., to provide a personalized view for visitors using, for example, visitor UE 113. In such a system, the registered users have uploaded their contacts to the media sharing service. Then, a visitor's personalized view is populated to contain media published by those registered users, whose contacts the visitor is found in. Thus, the visitor sees public media from people who know him or her. This provides the visitor with a personalized view of the public media in the system, and it also provides the registered users with a way to reach more of the individuals in their contacts list, without the need for the visitor to register in order to get a personalized view. Thus, this system enables the building mobile media sharing communities, even when only a part of the community has the appropriate device, operator, contract, and/or desire to actually share and/or publish media. After a visitor has accessed a personalized view, this information could be displayed to the registered users from whose contacts the visitor is found, in order to further boost the community.

The system can be implemented as a web site in the media sharing site at hand, or also as a software application, desktop software application, mobile device home screen/active idle widget, Nokia® Web Runtime application, Facebook® application, etc. so the visitors are not forced to use the service web site.

Figure 2:
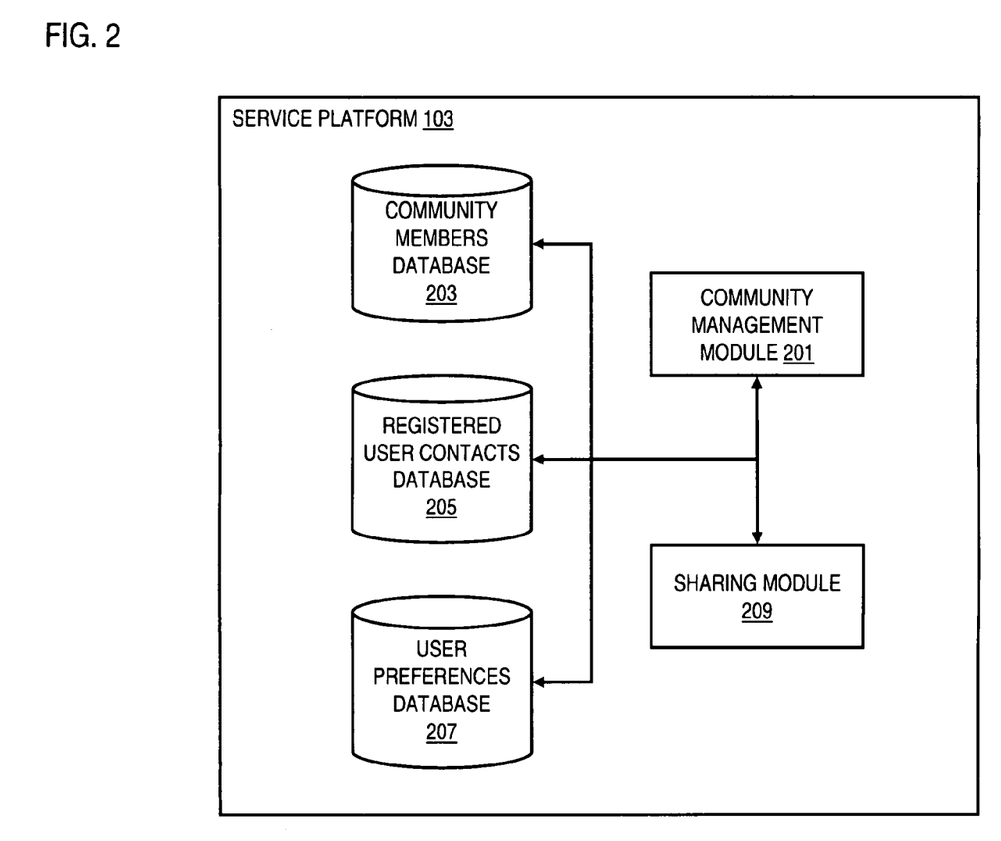
FIG. 2 is a diagram of components of a media sharing platform, according to an exemplary embodiment.

FIG. 2 is a diagram of components of a media sharing platform 103, according to an exemplary embodiment. The media sharing platform includes a community management module 201, a community members database 203, a registered user contacts database 205, a user preference database, and a sharing module 209. The community management module 201 can be used to monitor and manage the community members, which can include registered users, as well as visitors having temporary or limited access to the community. The community management module 201 can verify authorization of a user and/or UE to access the media sharing community. Data regarding the various members of the community, as well as their authorized access thereto, can be stored within the community members database 203. Additionally, the contacts of the registered users can be stored in the registered user contacts database 205, and the user preferences (e.g., which contacts of the registered user are allowed access to public and/or private media of the registered user, etc.) are stored in the user preference database 207. The sharing module 209 controls the actual sharing of media between registered users and/or visitors.

The community management module 201 also interacts with a sharing module 209 to manage the sharing of media among members of the community 109. In exemplary embodiments, the community management module authenticates members of the community 109 before permitting the sharing of the media. It is contemplated that the community management module 201 can use any authentication mechanism (e.g., user ID/password, device ID filtering, etc.) to ensure that only authorized members access the community 109, with visitors having limited and/or temporary access. After authentication, the sharing module 209, for instance, responds to requests from community members for both uploading and downloading of media between members of the community 109 according to any restrictions in place.

As shown in FIG. 2, the sharing module 209 has connectivity to the various databases 203, 205, 207. In certain embodiments, the sharing module 209 can store media in a database (not shown) for access by authorized members, or it can operate in a peer-to-peer mode whereby the media is transferred directly between members of the community 109.

Figure 3:
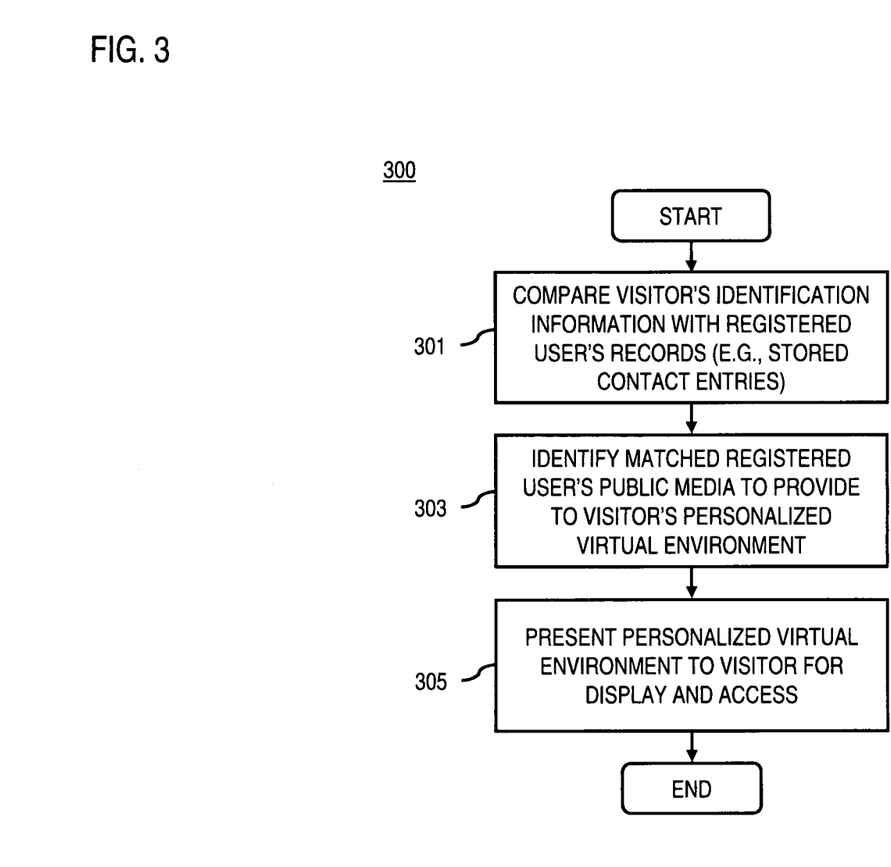
FIG. 3 is a flowchart of a process for providing a personalized virtual environment to a visitor of a media sharing community, according to one embodiment.

FIG. 3 is a flowchart of a process 300 for providing a personalized virtual environment to a visitor of a media sharing community, according to one embodiment. In this process, a visitor's identification information is compared with registered users' records, per step 301. Thus, the sharing module configured to compare identification information of a visitor with contact entries of a plurality of registered users of a media sharing community, which are stored in the registered user contacts database 205. In one embodiment, the visitor's identification information that is used for comparison is a telephone number, which is then compared to the telephone numbers in the contacts of the registered users. However, other unique identifying information can alternatively be used, such as other information contained in the contacts of the registered users (e.g., email address, physical address, etc.).

In one embodiment, the media sharing platform 103 determines the visitor's identifying information, in this case the visitor's phone number. For example, the media sharing platform 103 can determine such identifying information by requesting that the visitor can input the number to the site (and possibly sending and/or receiving security information via a short message service (SMS) communication or email confirming the visitor actually owns the number), a registered user can send an "invitation" or other message from the site to one of his contacts (that, e.g., contains a phone number or a token that identifies the phone number or contact entry) via either SMS or other contact detail (e.g., email), a mobile web browser could provide the phone number to the site, from the visitor's service provider account used to access the media sharing site, or a service provider home screen software application or Web Runtime application sends an SMS to the service.

In one embodiment, newly registered users can be provided with a customized visual environment; these new users can be users whose have contacts that are not yet uploaded to the service or who are web-only users (thus no contacts will be uploaded). For example, if a user already has an account, which contains the user's email or phone number, and logs in the service platform 103, such user could be shown prior registered users' public photos similarly to visitors. In such setup, there is a generic account, that can be used to log in to various services (e.g., Google® Account: Gmail, Google®Documents, Google® Reader, etc., Nokia® Account: Ovi Sync, Ovi Share, Ovi Maps, etc.).

In step 303, the sharing module 209 identifies public media (or even private media if the registered user allows access thereto in the user preferences) of the registered user(s) that have contacts that matched the visitor's identification information in order to provide such public media to the visitor's personalized virtual environment. The sharing module 209 can also check whether there are any user preferences stored in the user preferences database 207 that might restrict access to media of the registered user by such a visitor.

In step 305, the visitor is presented with the personalized virtual environment for display and access. The visitor can be provided with a personal uniform resource locator (URL) or personal identification number (PIN) code to access the personalized view. After accessing the personalized view, the visitor can comment on images, select a persistent visitor nickname, set up a notification system to get notified of new images via SMS or email, remove/hide some people from the personalized view, etc.

Thus, the media sharing platform 103 determines the visitor's identifying information (e.g., the visitor's phone number) by, for example, requesting that the visitor input the number to the site; via a token in a personal URL (e.g., a token-phone number pair stored by the service); via a pin code sign in (e.g., a pin code-phone number pair stored by the service); via a short messaging system (SMS) sent from a mobile phone application, Web Runtime (with respect to) application, or home screen software application to the service; getting the number from visitor's service provider account settings; or via some other mechanism. The sharing module 209 then matches the visitor's phone number to all contacts of the registered users' contacts in the service stored in the registered user contacts database 205. The matched contacts owners' published media is added to the personalized view of the visitor. The visitor is presented with the personalized view, and can order the media by time, owner, etc. If no contact matches are found, then the visitor is notified and shown the public interface instead.

Advantageously, the above process minimizes the use of network and device resources by creating a tailored user experience. For example, no processing resources are allocated to unwanted content, etc.

Figure 4:
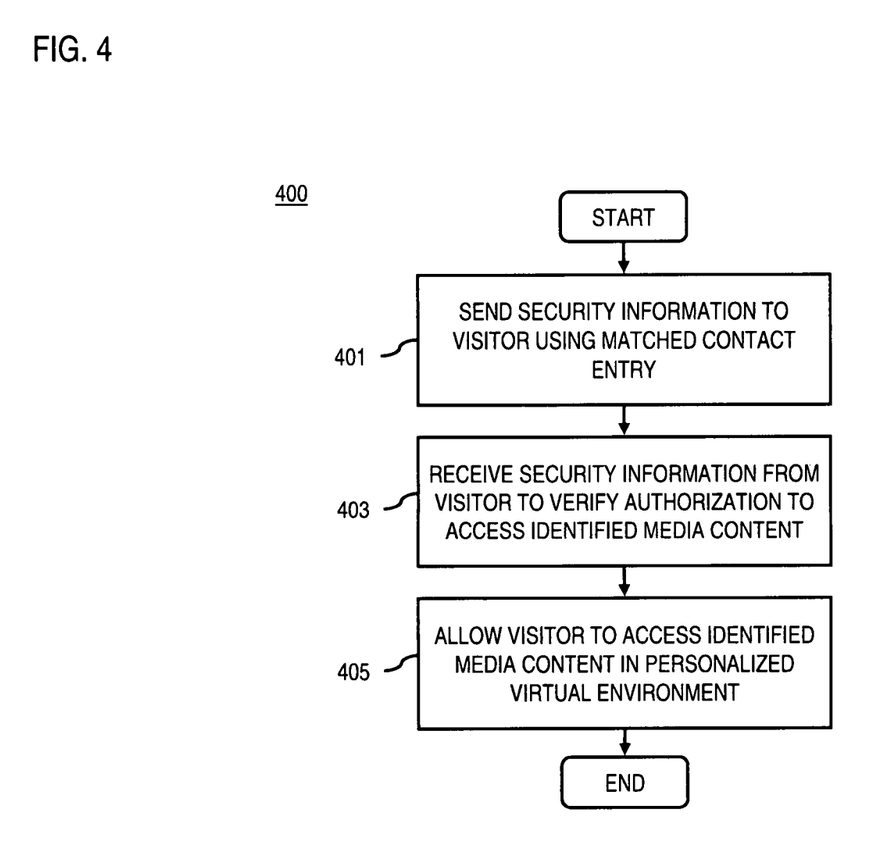
FIG. 4 is a flowchart of a process for verifying access to media content in a personalized virtual environment, according to one embodiment.

FIG. 4 is a flowchart of a process 400 for verifying access to media content in a personalized virtual environment, according to one embodiment. Such a process would help to ensure that the individual requesting access via entry of a telephone number (or email address, or other contact information) is in fact an individual that has access to that telephone number. Such a security measure would help to prevent someone from accessing shared media that relates to another person by entering in that person's telephone number.

In step 401, security information is sent to the visitor using the matched contact entry, which is based on the visitor's identification information. The community management module 201 of the media sharing platform can perform such a step. For example, the community management module 201 can send a PIN code, password, weblink, etc. to the person that corresponds to the matched contact entry via a listing in the contact entry. The visitor can then use the security information to access the personalized virtual environment. Thus, in step 403 the community management module 201 receives the security information from the visitor thereby verifying that the visitor is authorized to access the identified media content. Accordingly, in step 405, the visitor is allowed to access the identified media content in the personalized virtual environment.

Figure 5:
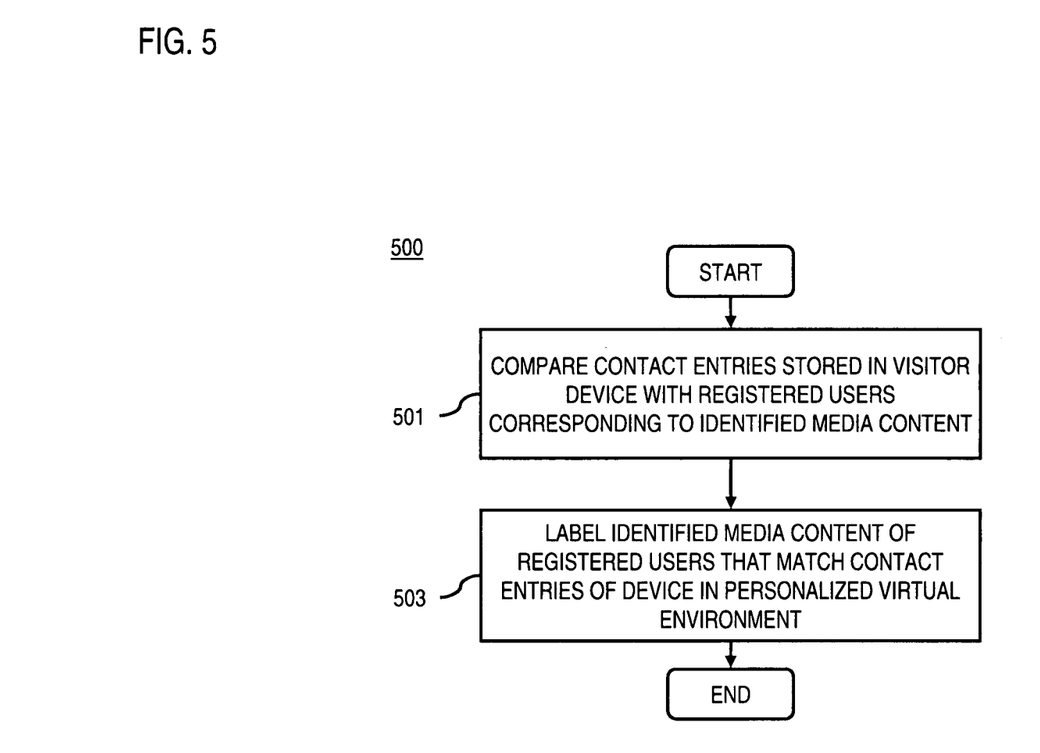
FIG. 5 is a flowchart of a process for labeling identified media content in the personalized virtual environment, according to various embodiments.

FIG. 5 is a flowchart of a process 500 for labeling identified media content in the personalized virtual environment, according to various embodiments. Such a process can further enhance the personalized virtual environment of the visitor. In step 501, contact entries stored in the device used by the visitor to visit the media sharing community are compared to the registered users corresponding to the identified media content. Then, in step 503, the identified media content of registered users that match contact entries in the visitor's device are labeled in the personalized virtual environment. Thus, if a registered user's identified media content is present in the visitor's personalized virtual environment, and that registered user's contact information is present in the visitor's device, then the identified media content is labeled with that registered user's name in the personalized virtual environment.

Thus, the personalized view can be enhanced using the contact entries in the visitor's mobile device. Therefore, for example, if the visitor is provided with a personalized view in a media sharing community and the visitor is using contact synchronization software with a related service provider, then the synced contacts could be used to perform a two-way match of the contacts entries of the registered users found to include the visitor's contact information. This would further filter the public media to be even more meaningful to the visitor. The owners of the identified media content can then be labelled in the visitor's personalized view. The contacts could also be available, if the visitor's view is implemented as a home screen software application (e.g., Nokia® home screen widget (N97)), a Web Runtime application (e.g., Nokia® Web Runtime application, or if the visitor is using Mobile Web Server, for example.

The system 100 also allows a registered user the option of blocking certain contacts from being able to view media (public or private) that might otherwise be accessed by visitors. Also, the registered user could block or provide a certain level of access to one or more groups of contacts. Thus, for example, a blocked phone number or group will not see the media of that registered user via contact matching, no matter if the viewer would be a registered user or a visitor. Also, the visitors are preferably not shown the registered user's phone numbers or names (though the names could possibly be found from a "me" contact card, or reverse matched via other registered users' contacts), but rather are only shown their username/screen name. The media shown in the personalized view is public, i.e. also viewable via the public site. In such an embodiment, he personalized view is not a privacy risk. Therefore, even if someone's personalized view is accessed by someone else, they do not know who the people are and for whom the view is personalized.

The system 100 advantageously allows registered users to expand their social circle. Additionally, visitors can advantageously obtain a personalized view to the media without registering. Further, privacy concerns can be effectively managed.

Figure 6:
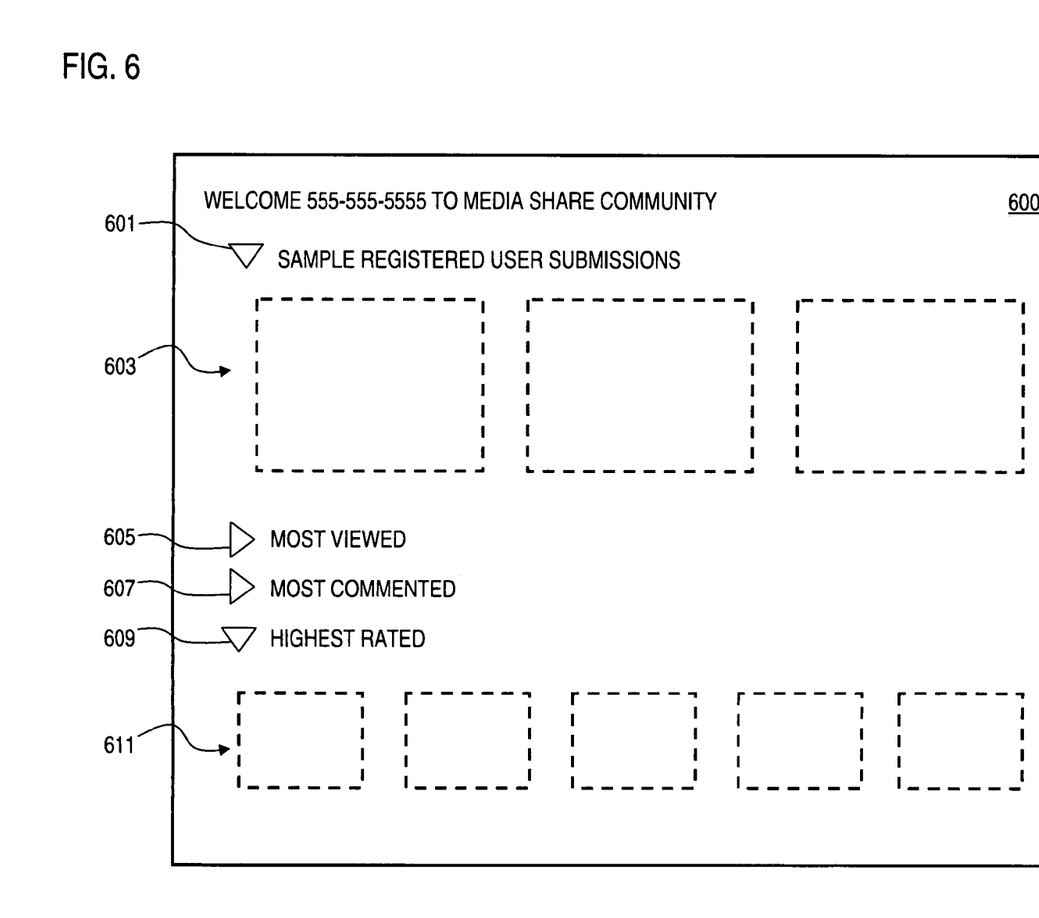
FIG. 6 is an exemplary screenshot of a user interface showing a display of a personalized virtual environment of a visitor to a media sharing community, according to one embodiment.

FIG. 6 is an exemplary screenshot 600 of a user interface showing a display of a personalized virtual environment of a visitor to a media sharing community, according to one embodiment. Under this scenario, the content shown can be based on a visitor phone number, in which the content can be grouped by owner, and arranged in various order. In this exemplary screenshot, a drop-down list of sample registered user submissions 601, which when activated can show one or more (in this case three) thumbnail representations 603 of shared media that were identified in the manner set forth in FIG. 3 by comparing the visitor's identification information with the registered user's stored contact entries. As noted above, if so desired, these thumbnail representations could be labeled by cross-matching such registered users with contract entries in the visitor's device. By selecting these thumbnail representations, the visitor could access individual photographs or groups of photographs, or play a video or audio clip, etc. In addition, the visitor's personalized virtual environment may also include different categories of public media accessible within the community, such as a Most Viewed drop-down list 605, a Most Commented drop-down list 607, and a Highest Rated drop-down list 609. In this exemplary screenshot, the Highest Rated drop-down list 607 has been activated to reveal a sampling of thumbnail representation 611, which the visitor can select to access.

As mentioned, the above processes can be applied to other services, in addition to media sharing, as such the content involve may or may not involve media content, but other information. For instance, in the context of social network, such content can be information about a member of the social network.

The processes described herein for providing personalized virtual environment for a visitor device may be implemented via software, hardware, e.g., general processor, Digital Signal Processing (DSP) chip, an Application Specific Integrated Circuit (ASIC), Field Programmable Gate Arrays (FPGAs), etc., firmware or a combination thereof. Such exemplary hardware for performing the described functions is detailed below.

Figure 7:
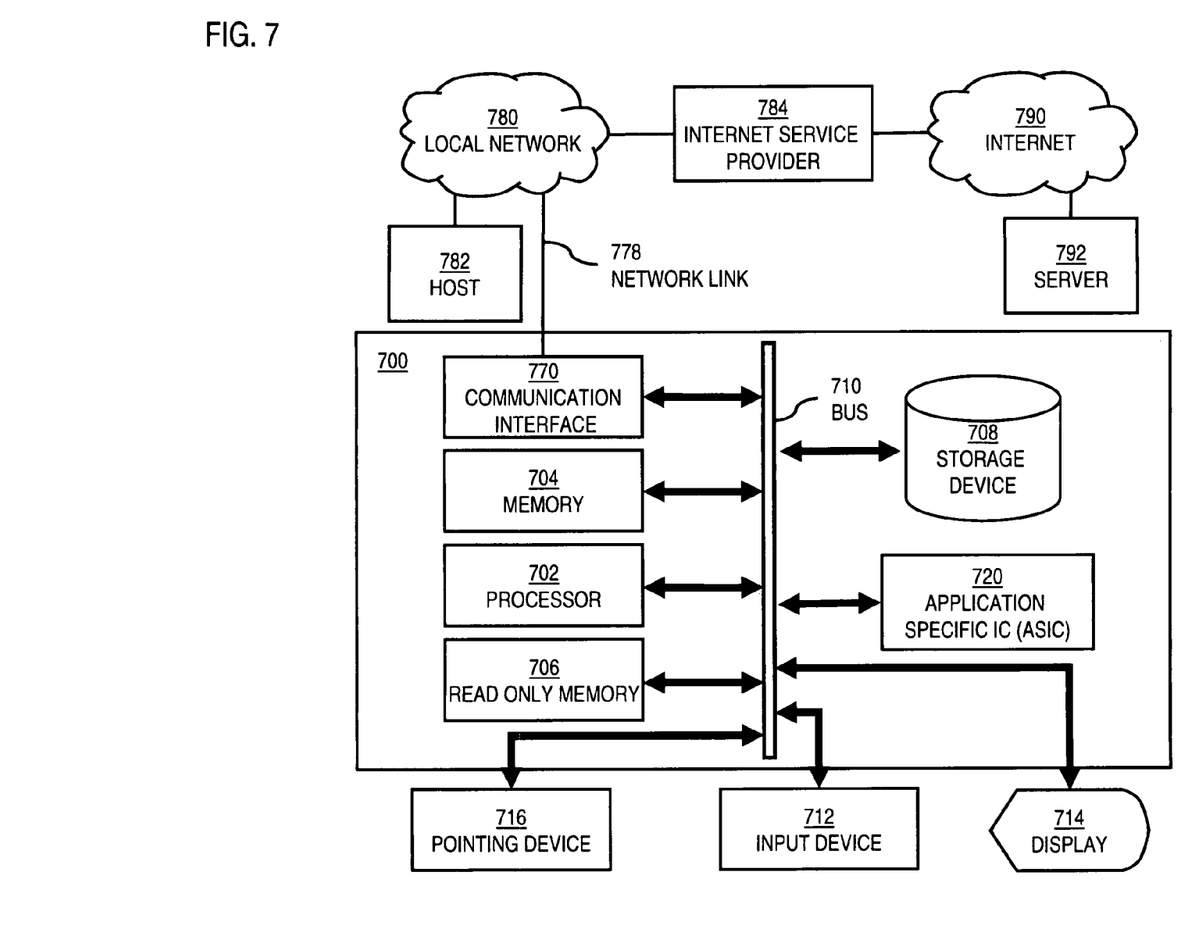
FIG. 7 is a diagram of hardware that can be used to implement an embodiment of the invention.

FIG. 7 illustrates a computer system 700 upon which an embodiment of the invention may be implemented. Computer system 700 is programmed to provide applications as described herein and includes a communication mechanism such as a bus 710 for passing information between other internal and external components of the computer system 700. Information (also called data) is represented as a physical expression of a measurable phenomenon, for example electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information related to associating applications as well as reporting and retrieval of state information. The set of operations include bringing information in from the bus 710 and placing information on the bus 710. The set of operations also include, for example, comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for associating applications. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for manipulating applications, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for querying and retrieving state information of applications.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 8:
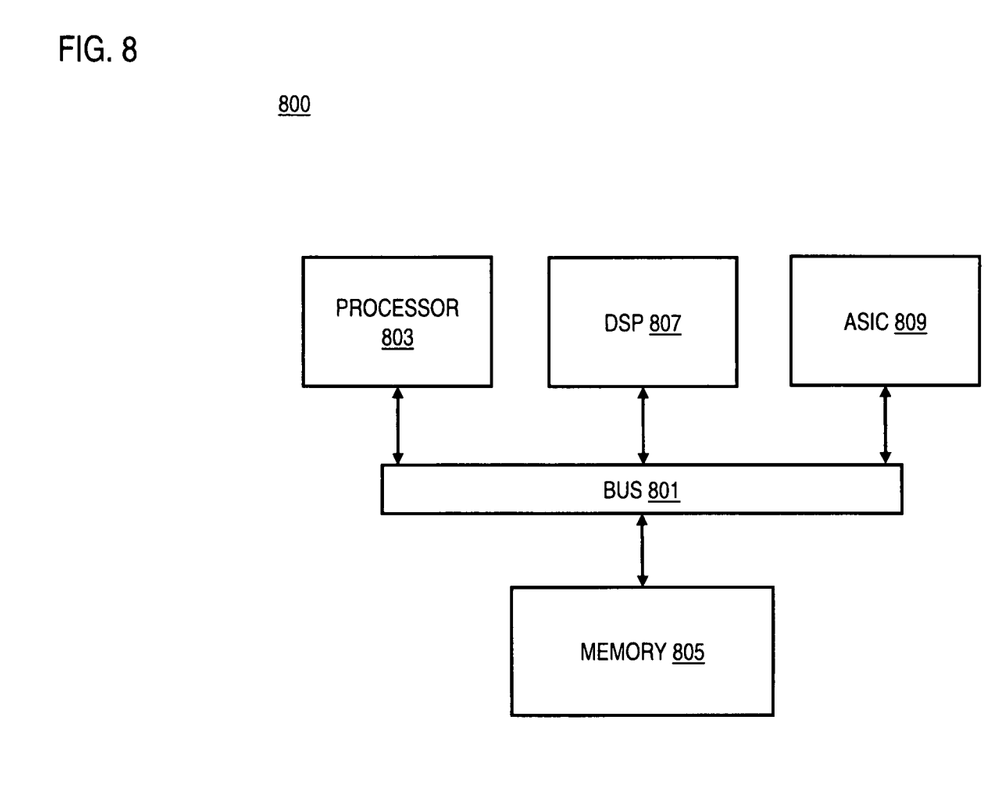
FIG. 8 is a diagram of a chip set that can be used to implement an embodiment of the invention.

FIG. 8 illustrates a chip set 800 upon which an embodiment of the invention may be implemented. Chip set 800 is programmed to associate applications as described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide association of widgets and utilization of state information. The memory 805 also stores the data associated with or generated by the execution of the inventive steps.

Figure 9:
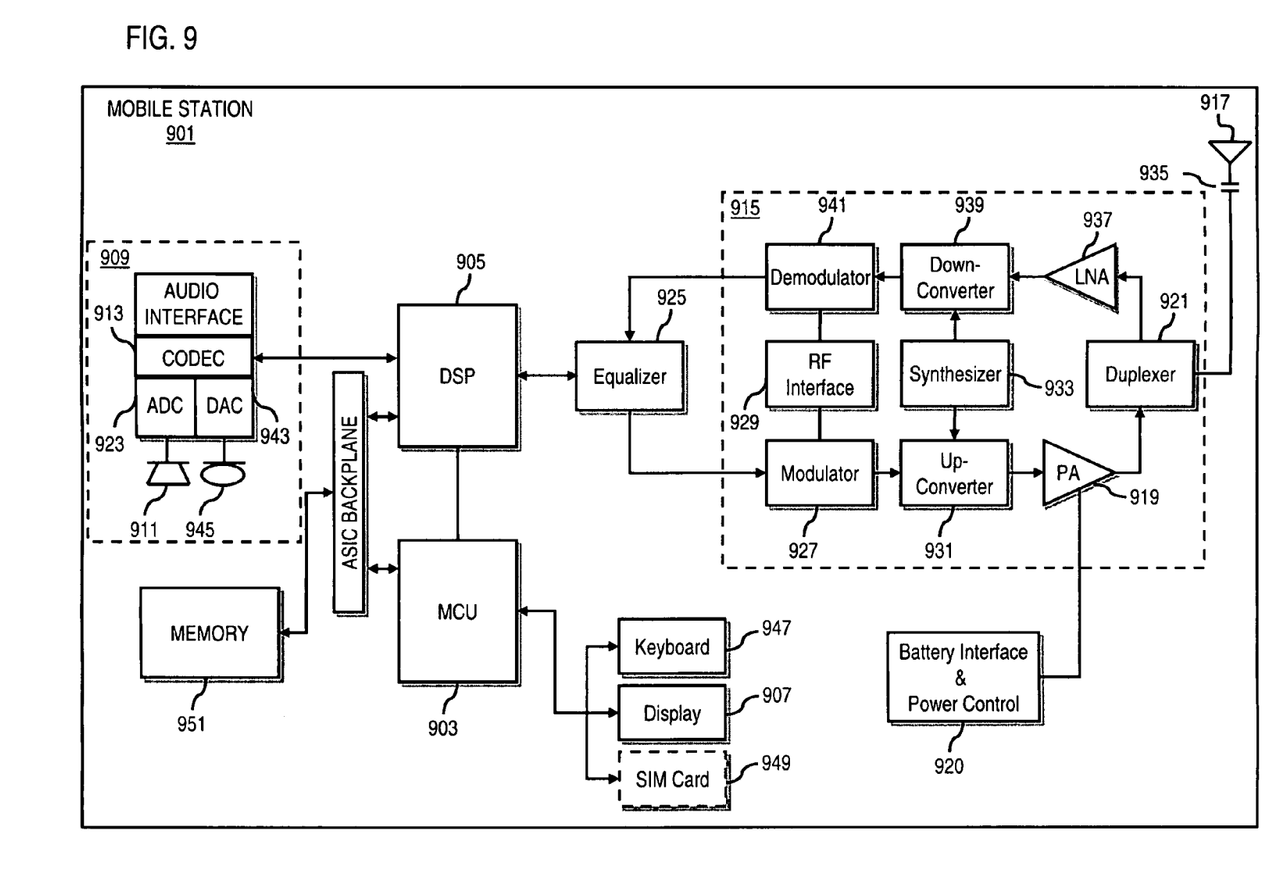
FIG. 9 is a diagram of a mobile station (e.g., handset) that can be used to implement an embodiment of the invention.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions, such as widgets. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 according to, for example, an multi-touch user interface. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   comparing identification information of a visitor with contact entries of a plurality of registered users of a service community;
   identifying content of one or more of the plurality of registered users including a contact entry associated with the identification information of the visitor to provide a personalized virtual environment of the visitor in the service community;
   sending security information, using the associated identification information, to the visitor that requests access to the identifying content;
   initiating permitted access by the visitor to the identified content on the personalized virtual environment following entering the security information; and
   performing a two-way match of the contact entries of the plurality of registered users to include contact entries of the visitor,
   wherein the visitor is provided a generic virtual environment and not a personalized virtual environment when the identification information of the visitor is not associated with any of the contact entries of the plurality of registered users.

2. A method of claim 1, further comprising:
   presenting the personalized virtual environment for display, wherein the visitor has access to the identified content of the one or more of the plurality of registered users including the contact entry associated with the identification information of the visitor.

3. A method of claim 1, wherein the identified content for the personalized virtual environment is publicly accessible content in the service community.

4. A method of claim 1, wherein the identification information is a phone number of a device of the visitor.

5. A method of claim 1, further comprising:
   restricting access to the identified content using user preferences set by the one or more of the plurality of registered users including the contact entry associated with the identification information of the visitor.

6. A method of claim 1, further comprising:
   comparing contact entries stored in a device of the visitor with the one or more of the plurality of registered users corresponding to the identified content; and
   labeling the identified content of the one or more of the plurality of registered users that are associated with the contact entries stored in the device of the visitor in the personalized virtual environment using the associated contact entries of the visitor,
   wherein the identified content includes thumbnail representations of one or more of a photograph, a video, and an audio clip, and
   wherein labeling the identified content includes labeling the identified content with a name of the registered user that corresponds to the identified content.

7. An apparatus comprising:
   at least one processor; and
   at least one memory including computer program code,
   the at least one memory and the computer program code configured to, with the at least one processor, cause the apparatus to perform at least the following,
   compare identification information of a visitor with contact entries of a plurality of registered users of a service community,
   to identify content of one or more of the plurality of registered users including a contact entry associated with the identification information of the visitor to provide a personalized virtual environment of the visitor in the service community,
   to send security information, using the associated identification information, to the visitor that requested access to the identifying content;
   to initiate permitted access by the visitor to the identified content on the personalized virtual environment following entering the security information; and
   performing a two-way match of the contact entries of the plurality of registered users to include contact entries of the visitor,
   wherein the visitor is provided a generic virtual environment and not a personalized virtual environment when the identification information of the visitor is not associated with any of the contact entries of the plurality of registered users.

8. An apparatus of claim 7, wherein the apparatus is further caused to: present the personalized virtual environment for display to allow the visitor access to the identified content of the one or more of the plurality of registered users that have the contact entry associated with the identification information of the visitor.

9. An apparatus of claim 7, wherein the identified content for the personalized virtual environment is publicly accessible content in the service community.

10. An apparatus of claim 7, wherein the identification information is a phone number of a device of the visitor.

11. An apparatus of claim 7, wherein the apparatus is further caused to:
restrict access to the identified content using user preferences set by the one or more of the plurality of registered users including the contact entry associated with the identification information of the visitor.

12. An apparatus of claim 7, wherein the apparatus is further caused to:
compare contact entries stored in a device of the visitor with the one or more of the plurality of registered users corresponding to the identified content; and
label the identified content of the one or more of the plurality of registered users that are associated with the contact entries stored in the device of the visitor in the personalized virtual environment using the associated contact entries of the visitor,
wherein the identified content includes thumbnail representations of one or more of a photograph, a video, and an audio clip, and
wherein label the identified content includes label the identified content with a name of the registered user that corresponds to the identified content.

13. A method comprising:
providing identification information of a visitor to a service community having a plurality of registered users for comparison of the identification information of the visitor with contact entries of the plurality of registered users, and for identification of content of one or more of the plurality of registered users that have a contact entry associated with the identification information of the visitor to provide a personalized virtual environment of the visitor in the service community;
initiating receipt of security information, which uses the associated identification information, by the visitor that requests access to the identified content;
initiating providing the received security information to the service community for access to the identified content on the personalized virtual environment; and
performing a two-way match of the contact entries of the plurality of registered users to include contact entries of the visitor,
wherein the visitor is provided a generic virtual environment and not a personalized virtual environment when the identification information of the visitor is not associated with any of the contact entries of the plurality of registered users.

14. A method of claim 13, further comprising:
initiating display of the personalized virtual environment.

15. A method of claim 13, wherein the identified content for the personalized virtual environment is publicly accessible content in the service community.

16. A method of claim 13, further comprising:
initiating presentation of a phone number as the identification information.

17. A method of claim 13, further comprising:
providing contact entries stored in a device associated with the visitor for comparison with the one or more of the plurality of registered users corresponding to the identified content in order to label the identified content of the one or more of the plurality of registered users associated with the contact entries stored in the device in the personalized virtual environment using the associated contact entries,
wherein the identified content includes thumbnail representations of one or more of a photograph, a video, and an audio clip, and
wherein label the identified content includes label the identified content with a name of the registered user that corresponds to the identified content.

* * * * *